US012306651B2

(12) United States Patent
Roh et al.

(10) Patent No.: US 12,306,651 B2
(45) Date of Patent: May 20, 2025

(54) LOW DROPOUT VOLTAGE REGULATOR

(71) Applicant: INDUSTRY-UNIVERSITY COOPERATION FOUNDATION HANYANG UNIVERSITY ERICA CAMPUS, Ansan-si (KR)

(72) Inventors: Jeongjin Roh, Ansan-si (KR); Jungsik Kim, Ansan-si (KR); Yeonggwang Bae, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 258 days.

(21) Appl. No.: 18/090,162

(22) Filed: Dec. 28, 2022

(65) Prior Publication Data

US 2023/0205246 A1 Jun. 29, 2023

(30) Foreign Application Priority Data

Dec. 29, 2021 (KR) ........................ 10-2021-0190747

(51) Int. Cl.
*G05F 1/575* (2006.01)

(52) U.S. Cl.
CPC .................................... *G05F 1/575* (2013.01)

(58) Field of Classification Search
CPC ........ G05F 1/56; G05F 1/575; H02M 1/4225; H02M 1/4226; H02M 1/4227;
(Continued)

(56) References Cited

U.S. PATENT DOCUMENTS

2004/0257159 A1* 12/2004 Slamowitz .......... H03F 3/45179 330/261
2016/0224040 A1 8/2016 Peluso et al.

FOREIGN PATENT DOCUMENTS

KR 10-2012-0073832 A 7/2012
KR 10-2013-0002358 A 1/2013
(Continued)

OTHER PUBLICATIONS

Office Action of KIPO for Korean application No. 10-2021-0190747, issued on Aug. 16, 2023.

*Primary Examiner* — Jue Zhang
(74) *Attorney, Agent, or Firm* — NKL LAW; Jae Youn Kim

(57) ABSTRACT

Disclosed herein is a low dropout (LDO) voltage regulator including an amplifier configured to receive a reference voltage through a negative input terminal, receive a feedback voltage through a positive input terminal, and amplify a difference between the feedback voltage and the reference voltage; a buffer which has an input connected to an output of the amplifier and an output and performs a buffering operation; a pass transistor configured to generate a driving current according to an output signal of the buffer; a voltage divider configured to form an output signal according to the driving current and generate a feedback voltage through a feedback resistor connected thereto; and a negative resistor circuit connected between the reference voltage and the feedback resistor and configured to generate a compensation current compensating for a loss current generated in the feedback resistor. In accordance with the present invention, the LDO voltage regulator, which greatly improves load regulation with a wide bandwidth by increasing a gain without increasing a size and current consumption of a transistor inside an amplifier, can be provided.

8 Claims, 6 Drawing Sheets

(58) Field of Classification Search
CPC .. H02M 1/4228; H02M 1/4229; H02M 1/423; H02M 1/4231; H02M 1/4232; H02M 1/4233
See application file for complete search history.

(56) References Cited

FOREIGN PATENT DOCUMENTS

| | | | | |
|---|---|---|---|---|
| KR | 10-2016-0012858 | A | | 2/2016 |
| KR | 20160012858 | A | * | 2/2016 |
| KR | 10-2016-0137803 | A | | 12/2016 |
| KR | 20160137803 | A | * | 12/2016 |

* cited by examiner

LOW DROPOUT VOLTAGE REGULATOR

CROSS-REFERENCE TO RELATED APPLICATION

This application claims priority to and the benefit of Korean Patent Application No. 10-2021-0190747, filed on Dec. 29, 2021, the disclosure of which is incorporated herein by reference in its entirety.

BACKGROUND

1. Field of the Invention

The present invention relates to a low dropout (LDO) voltage regulator, and more particularly, to an LDO voltage regulator which compensates for internal electrical loss.

2. Discussion of Related Art

FIG. 1 is a diagram illustrating a conventional low dropout (LDO) voltage regulator.

Referring to FIG. 1, the conventional LDO voltage regulator basically operates by comparing a reference voltage Vref with a feedback voltage Vf. When a power output Vout decreases, an amplifier Amp adjusts an output level after comparing the power output Vout with the reference voltage Vref, and a pass transistor Pass tr generates a more current to recover the power output Vout.

However, due to a capacitor Cout connected between an output terminal and the ground and the large-sized pass transistor Pass tr, two low-frequency poles are generated, which degrades LDO safety. Therefore, by adding a buffer between the amplifier and the pass transistor, a low-frequency pole of a gate terminal of the pass transistor is shifted to a high-frequency band so that stability of a circuit can be increased.

Meanwhile, a large voltage gain is required to increase the performance of the LDO voltage regulator as shown in FIG. 1, and a wide bandwidth is required for a faster operation.

However, in order to increase a voltage gain, a size of the amplifier of the LDO voltage regulator should be increased or a current should be reduced. When the size of the amplifier is increased, an operation range in a saturation region of the transistor is reduced, and thus an operation range of the amplifier is also reduced due to an output current. That is, when the size of the amplifier is increased, an amount of the output current is limited.

In addition, since a bandwidth is reduced when a current is reduced, the voltage gain and the bandwidth have a trade-off relationship. In this case, there is a limit to increasing both the voltage gain and the bandwidth.

For application to various fields including power management integrated circuits (PMICs) and micro-portable electronic devices operating in a high-frequency band, research is needed to increase an overall voltage gain of an LDO voltage regulator and also widen the bandwidth thereof.

SUMMARY OF THE INVENTION

The present invention is directed to a low dropout (LDO) voltage regulator which greatly improves load regulation with a wide bandwidth by increasing a gain without increasing a size and current consumption of a transistor inside an amplifier.

According to an aspect of the present invention, there is provided an LDO voltage regulator including an amplifier configured to receive a reference voltage through a negative input terminal, receive a feedback voltage through a positive input terminal, and amplify a difference between the feedback voltage and the reference voltage; a buffer which has an input connected to an output of the amplifier and an output and performs a buffering operation; a pass transistor configured to generate a driving current according to an output signal of the buffer; a voltage divider configured to form an output signal according to the driving current and generate a feedback voltage through a feedback resistor connected thereto; and a negative resistor circuit connected between the reference voltage and the feedback resistor and configured to generate a compensation current compensating for a loss current generated in the feedback resistor.

The negative resistor circuit may include a cross-coupled inverter.

The compensation current may have a value that is proportional to a difference between the feedback voltage and the reference voltage and that is inversely proportional to the feedback resistance.

The voltage divider may include a first resistor having one end connected to the pass transistor, and a second resistor connected between a ground and the other end of the first resistor where the feedback voltage is generated.

The negative resistance circuit may include a first inverter configured to generate a first inverting output in response to the reference voltage, and a second inverter configured to generate a second inverting output in response to the feedback voltage, wherein the second inverting output may be connected to a gate of the first inverter, and the first inverting output may be connected to a gate of the second inverter.

The first inverter may include a first p-type metal oxide semiconductor (PMOS) transistor and a first n-type metal oxide semiconductor (NMOS) transistor which have common gates connected to each other at a first node, the second inverter may include a second PMOS transistor and a second NMOS transistor which have common gates connected to each other at a second node, a drain of the first PMOS transistor and a drain of the first NMOS transistor may be connected to the second node, and a drain of the second PMOS transistor and a drain of the second NMOS transistor may be connected to the first node.

The negative resistance circuit may further include third and fourth resistors connected in series, wherein one end of the third resistor may be connected to a source of the first PMOS transistor, and one end of the fourth resistor may be connected to a source of the second PMOS transistor.

The negative resistance circuit may further include fifth and sixth resistors connected in series, wherein one end of the fifth resistor may be connected to a source of the first NMOS transistor, and one end of the sixth resistor may be connected to a source of the second NMOS transistor.

The negative resistance circuit may further include a seventh resistor having one end connected to the reference voltage and the other end connected to the first node, wherein the seventh resistor may have a resistance value that is equivalent to the feedback resistor.

The negative resistance circuit may further include a third PMOS transistor having a source connected to a power input, a drain connected between the third and fourth resistors, and a gate connected to a control voltage; and a third NMOS transistor having a source connected to the ground, a drain connected between the fifth and sixth resistors, and a gate connected to the control input.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which.

DETAILED DESCRIPTION OF EXEMPLARY EMBODIMENTS

Figure 1:
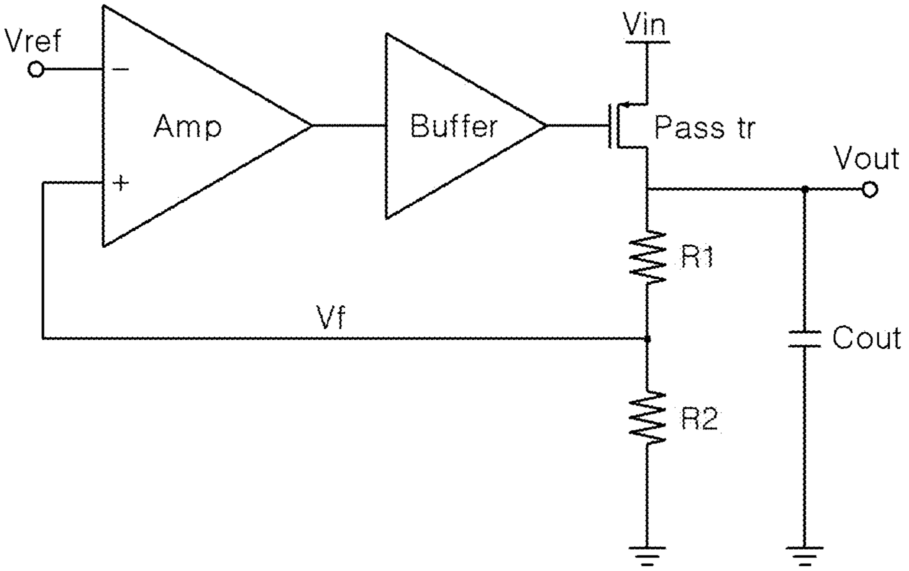
FIG. 1 PRIOR ART
FIG. 1 is a diagram illustrating a conventional low dropout (LDO) voltage regulator.

The above and other objectives, features, and advantages of the present disclosure will become more apparent from the following description of exemplary embodiments with reference to the accompanying drawings. However, the present invention is not limited to the embodiments disclosed herein and may be implemented in other forms. Rather, the embodiments disclosed herein are provided so that the disclosed content can be more thorough and complete and the spirit of the present invention can be sufficiently conveyed to those skilled in the art, without any intention other than to provide convenience of understanding.

In the present specification, when it is mentioned that certain elements or lines are connected to a target element block, it includes not only a direct connection but also an indirect connection to the target element block through some other elements.

In addition, the same or similar reference numerals presented in each drawing denote the same or similar components where possible. In some drawings, connection relationships between elements and lines are only shown for effective description of technical content, and other elements or circuit blocks can be further provided.

Each embodiment described and illustrated herein may also include a complementary embodiment thereof, and it is noted that a general operation of voltage regulation in a low dropout type and details of circuits or devices for performing the general operation are not described in detail so as not to obscure the gist of the present invention.

Figure 2:
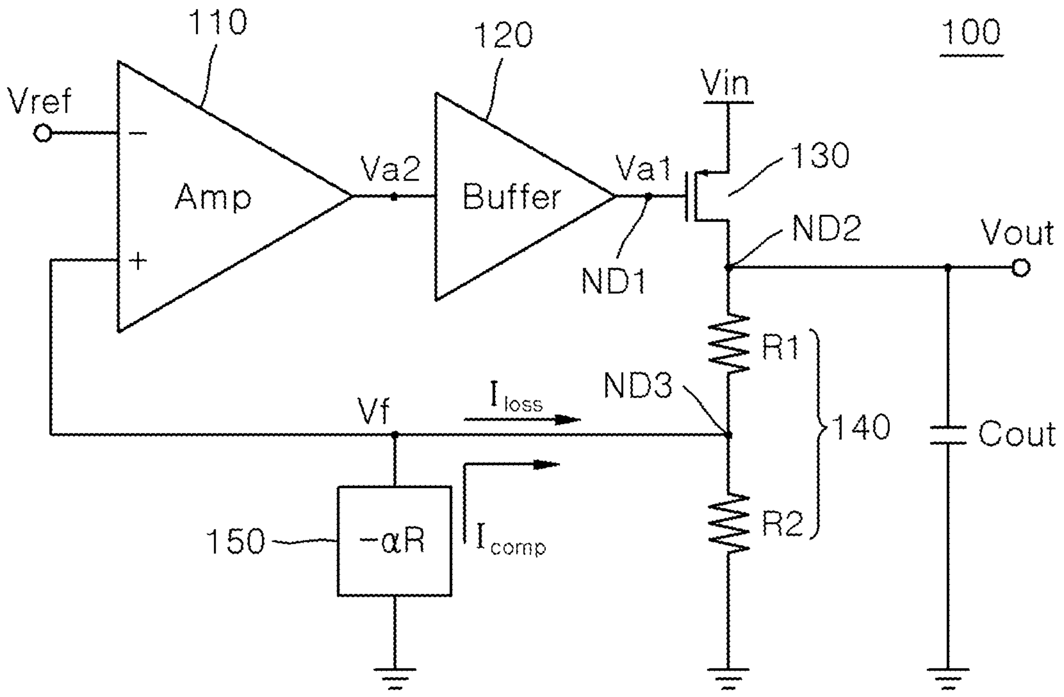
FIG. 2 is a diagram illustrating an example of an LDO voltage regulator according to an embodiment of the present invention.

FIG. 2 is a diagram illustrating an example of a low dropout (LDO) voltage regulator according to an embodiment of the present invention.

Referring to FIG. 2, an LDO voltage regulator 100 includes an amplifier 110 configured to amplify a difference between a feedback voltage Vf and a reference voltage Vref, a buffer 120 configured to perform a buffering operation, a pass transistor 130 configured to generate a driving current according to an output signal of the buffer 120, a voltage divider 140 configured to form an output signal according to the driving current and generate a feedback voltage through feedback resistors R1 and R2 connected thereto, and a negative resistor circuit 150 configured to generate a compensation current $I_{comp}$ which compensates for a loss current $I_{loss}$ by the feedback resistors R1 and R2.

First, the pass transistor 130 may be formed as a p-type metal oxide semiconductor (PMOS) transistor. The PMOS transistor serving as a voltage-controlled current switch receives a power input Vin through a source and a control input Va1 through a gate. A drain of the PMOS transistor is connected to an output node ND2 and provides a power output Vout.

The pass transistor 130 has a power input Vin connected to a voltage source, a power output Vout connected to a load, and a control input Va1. When the power output Vout changes due to a load variation, a voltage level of the control input Va1 is adjusted so that the power output Vout of the pass transistor 130 is controlled to a target level.

The buffer 120 is connected to an input Va2 and the control input Va1 of the pass transistor 130 to perform a buffering operation.

The amplifier 110 has a positive input (+) connected to a sampled voltage Vf of the power output Vout of the pass transistor 130, a negative input (−) connected to the reference voltage Vref, and an output Va2 connected to an input of the buffer 120.

Here, the sampled voltage Vf may be a voltage divided by the feedback resistors R1 and R2 of the voltage divider 140. The feedback resistors R1 and R2 are connected at a node ND3. The sampled voltage Vf is a voltage at the node ND3.

A resistance ratio of the feedback resistors R1 and R2 may be set to a ratio obtained by dividing a voltage (target voltage) when the power output Vout is stabilized by the reference voltage Vref.

The reference voltage Vref may be provided from a voltage divider circuit using feedback resistors or a band-gap reference circuit for providing a stable reference voltage. The band-gap reference circuit is a voltage generator circuit which is insensitive to a temperature change.

The negative resistor circuit 150 is connected between the reference voltage Vref and the feedback resistors R1 and R2 to generate a current for compensating for the loss current $I_{loss}$ by the feedback resistors R1 and R2.

In the drawing, although it has been shown that a negative resistor circuit is connected between the node ND3 and a ground, this is merely for convenience of description of a loss current and a compensation current, and the present invention is not limited to the illustrated example.

The loss current $I_{loss}$ may be proportional to a difference between the feedback voltage Vf and the reference voltage Vref and may be inversely proportional to the feedback resistors R1 and R2.

Thus, in order for compensating for a current loss generated in the feedback resistors through the negative resistor circuit having the same impedance value as the feedback resistors, the compensation current $I_{comp}$ generated by the negative resistor circuit is generated to be the same as the current loss.

This increases a voltage gain and a bandwidth of the LDO voltage regulator 100 simultaneously so that the reliability and performance of the LDO voltage regulator 100 are improved.

A mathematical arithmetic process of the above description is as follows.

In the circuit shown in FIG. 2, a value obtained by multiplying ΔV corresponding to a difference between the feedback voltage Vf and the reference voltage Vref by a voltage gain Av of the entire LDO voltage regulator is a power output Vout (Equations 1 and 2 below). Therefore, when this is expressed in a relationship as shown in Equation 3 below, and when the voltage gain Av is infinite, a value of ΔV becomes zero so that the LDO voltage regulator 100 has an ideal virtual ground. However, since the voltage gain Av is not infinite, ΔV becomes non-zero.

$$\Delta V = V_f - V_{ref} \quad \text{[Equation 1]}$$

$$V_{out} = A_v \Delta V \quad \text{[Equation 2]}$$

$$A_v = \frac{V_{out}}{\Delta V} \quad \text{[Equation 3]}$$

Thus, the loss current $I_{loss}$ is considered.

A calculation process of the compensation current $I_{comp}$ to compensate for the loss current $I_{loss}$ is as follows.

Hereinafter, for convenience of description, it is assumed that a resistance value of the first resistor R1 of the voltage divider 140 is 2R, which is a multiple of R, and that a resistance value of the second resistor R2 is 2R in the same manner as in the first resistor R1. This allows a resistance value of the negative resistor circuit to be expressed as a multiple of R.

When viewed from a feedback stage, the feedback resistors R1 and R2 can be seen as being connected in parallel as shown in the following Equation 4.

Accordingly, the loss current $I_{loss}$ can be expressed as shown in the following Equation 5.

Accordingly, the compensation current $I_{comp}$ satisfying the following Equation 6 is generated in the negative resistor circuit 150 according to the embodiment of the present invention as much as the loss current $I_{loss}$.

This satisfies the following Equation 7.

$$2R//2R = \frac{4R^2}{2R+2R} = R \quad \text{[Equation 4]}$$

$$I_{loss} = \frac{\Delta V}{R} \quad \text{[Equation 5]}$$

$$I_{comp} = \frac{\Delta V}{-\alpha R} \quad \text{[Equation 6]}$$

$$I_{loss} + I_{comp} = \frac{\Delta V}{R} + \frac{\Delta V}{-\alpha R} = \frac{(1-\alpha)\Delta V}{\alpha R} \quad \text{[Equation 7]}$$

Here, α is a coincidence coefficient between a resistance value R when the feedback resistors R1 and R2 are viewed from the feedback stage and a resistance value of the negative resistor.

As an example, when α=1 and it is assumed that the resistance values are ideally the same, since there is no current movement as a result, the value of ΔV also becomes zero and the voltage gain Av of the LDO voltage regulator 100 becomes infinite.

Therefore, the LDO voltage regulator to which the negative resistor is applied improves the voltage gain Av to the extent that the value of α is close to one.

Meanwhile, from the point of view of the bandwidth, a gain bandwidth product (GBW) may be expressed by a product of the voltage gain Av of the LDO voltage regulator and a 3 dB pole (w3 dB) in a one-pole system, and the GBW is equal to a unity gain bandwidth which represents performance. This is expressed as the following Equation.

$$GBW = A_v \times w_{3dB} \quad \text{[Equation 8]}$$

Here, it can be seen that when the GBW is constant, the voltage gain Av and the 3 dB pole (w3 dB) are in inverse proportion.

However, in the case of the LDO voltage regulator using a negative resistor, the 3 dB pole (w3 dB) does not change and only the voltage gain Av is improved so that the GBW is increased as much as the voltage gain Av is improved.

Therefore, the performance may be improved by improving the unity gain bandwidth of the LDO voltage regulator through the negative resistor.

Meanwhile, since the negative resistor does not actually exist, a circuit cannot be formed as in FIG. 2 described above. Therefore, as will be described below, the negative resistor may be formed of two cross-coupled inverters.

Hereinafter, a structure of the negative resistor circuit according to an embodiment of the present invention will be described in more detail.

Figure 3:
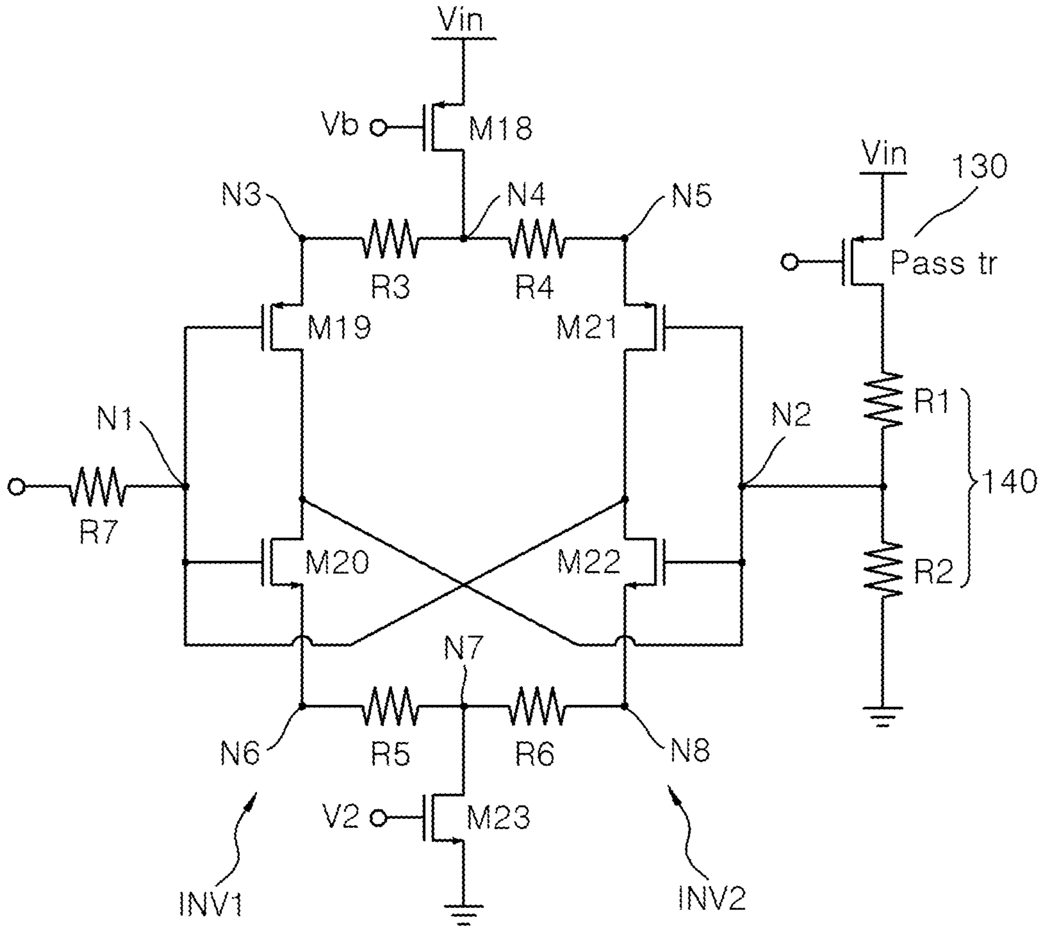
FIG. 3 is a diagram illustrating an example of a negative resistor circuit according to an embodiment of the present invention.

FIG. 3 is a diagram illustrating an example of a negative resistor circuit according to an embodiment of the present invention.

Referring to FIG. 3, as described above, the negative resistor circuit 150 is connected between the reference voltage Vref and the feedback resistors R1 and R2.

The negative resistor circuit 150 has a structure of two cross-coupled inverters.

More specifically, the negative resistor circuit 150 includes a first inverter INV1 formed of a $19^{th}$ transistor M19 and a $20^{th}$ transistor M20, and a second inverter INV2 formed of a $21^{st}$ transistor M12 and a $22^{nd}$ transistor M22. The first inverter INV1 receives a signal of the second inverter INV2, and the second inverter INV2 receives a signal of the first inverter INV1.

A gate of the $19^{th}$ transistor M19 receives a voltage of a first node N1 in common with a gate of the $20^{th}$ transistor M20. A voltage is formed at the first node N1 by the signal of the second inverter INV2.

A gate of the $21^{st}$ transistor M21 receives a voltage of a second node N2 in common with a gate of the $22^{nd}$ transistor M22. A voltage is formed at the second node N2 by the signal of the first inverter INV1.

In this case, since the second node N2 is connected to the node ND3 described above in FIG. 2, the gate of the $21^{st}$ transistor M21 receives the feedback voltage Vf in common with the gate of the $22^{nd}$ transistor M22.

A source of the $19^{th}$ transistor M19 is connected to a third resistor R3 at a third node N3. The third resistor R3 is connected to a fourth resistor R4 in series through a fourth node N4. A source of the $21^{st}$ transistor M21 is connected to the fourth resistor R4 at a fifth node N5.

A source of the $20^{th}$ transistor M20 is connected to a fifth resistor R5 at a sixth node N6. The fifth resistor R5 is connected to the sixth resistor R6 in series through a seventh node N7. A source of the $22^{nd}$ transistor M22 is connected to the sixth resistor R6 at an eighth node N8.

A drain of the $21^{st}$ transistor M21 and a drain of the $22^{nd}$ transistor M22 are connected at the first node N1. A drain of the $19^{th}$ transistor M19 and a drain of the $20^{th}$ transistor M20 are connected at the second node N2.

In addition, the negative resistor circuit 150 includes an $18^{th}$ transistor M18 having a source connected to the power input Vin, a gate connected to the control voltage terminal Vb, and a drain connected to the fourth node N4, and a $23^{rd}$ transistor M23 having a drain connected to the seventh node N7, a gate connected to the second control input V2, and a source connected to the ground.

Figure 4:
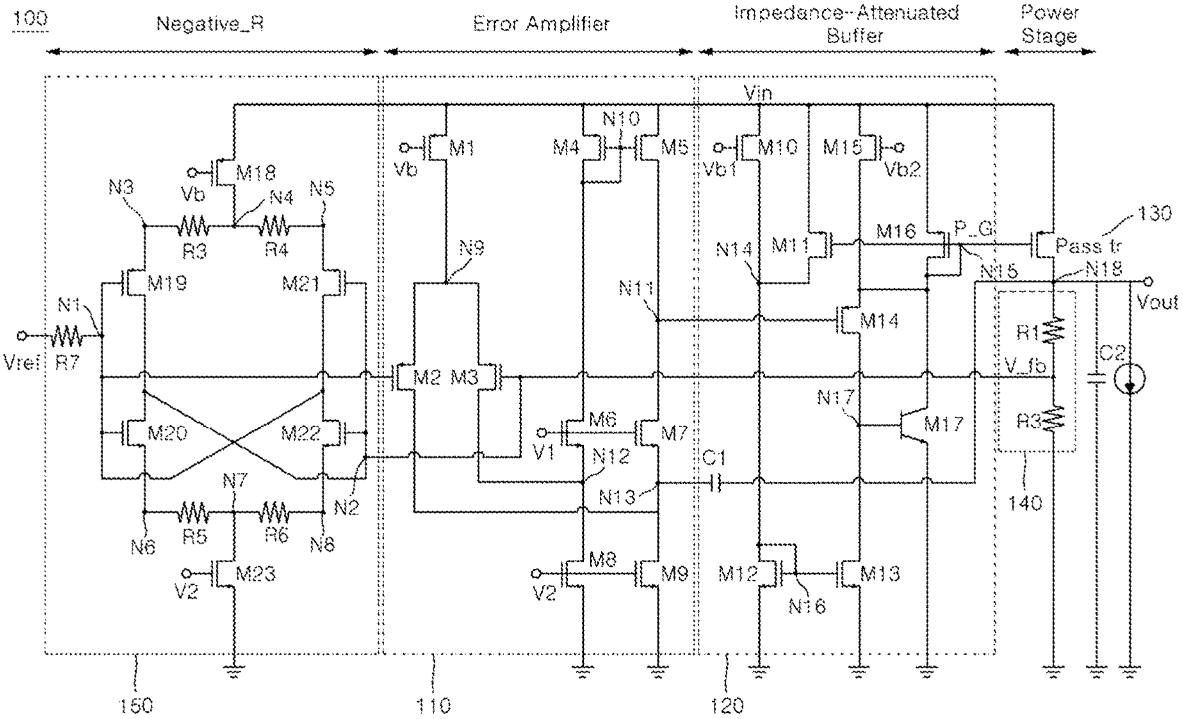
FIG. 4 is a diagram illustrating an example of the entirety of the LDO voltage regulator to which the negative resistor circuit according to the embodiment of the present invention is applied.

FIG. 4 is a diagram illustrating an example of the entirety of the LDO voltage regulator to which the above-described negative resistor circuit of FIG. 3 is applied.

Referring to FIG. 4, the LDO voltage regulator 100 includes a negative resistor Negative_R, an error amplifier, an impedance-attenuated buffer, and a power stage. The negative resistor Negative_R corresponds to the above-described negative resistor circuit. The error amplifier corresponds to the above-described amplifier. The impedance-attenuated buffer corresponds to the above-described buffer. In addition, the power stage corresponds to the above-described pass transistor and the above-described voltage divider. Since the same description as described above can be applied, the following description will mainly focus on differences.

The error amplifier will be described first.

The error amplifier includes a first transistor M1 having a source connected to the power input Vin, a gate connected to the control voltage terminal Vb, and a drain connected to a source of a $2^{nd}$ transistor M2 and a source and drain of a $3^{rd}$ transistor M3 at a ninth node N9.

The $2^{nd}$ transistor M2 is gated by the voltage of the first node N1, and the $3^{rd}$ transistor M3 is gated by the voltage of the second node N2.

That is, in the error amplifier, a feedback signal V_fb, which is divided and fed back through the first resistor and the second resistor of the voltage divider, is input to the gate of the $3^{rd}$ transistor M3, a reference voltage dropped by a seventh resistor R7 is input to the gate of the $2^{nd}$ transistor M2, a difference between the feedback signal V_fb and the dropped reference voltage is compared and amplified, and the amplified signal is input to the gate of the buffer 120.

In addition, the error amplifier includes $4^{th}$ and $5^{th}$ transistors M4 and M5 having common gates connected to each other, $6^{th}$ and $7^{th}$ transistors M6 and M7 having common gates connected to each other, and $8^{th}$ and $9^{th}$ transistors M8 and M9 having common gates connected to each other.

In this case, the gate and a drain of the $4^{th}$ transistor M4 are connected to each other. The $4^{th}$ transistor M4 may have the same function as a diode.

A drain of the $6^{th}$ transistor M6 is connected to a drain of the $4^{th}$ transistor M4, a source thereof is connected to a drain of the $8^{th}$ transistor M8 at a twelfth node N12, and the gate thereof is connected to a first control input V1. In this case, a drain of the $3^{rd}$ transistor M3 is also connected to the twelfth node N12.

A drain of the $7^{th}$ transistor M7 is connected to a drain of the $5^{th}$ transistor M5 at an eleventh node N11, a source thereof is connected to a drain of the $9^{th}$ transistor M9 at a thirteenth node N13, and the gate thereof is connected to the first control input V1. In this case, a drain of the $2^{nd}$ transistor M2 is also connected to the thirteenth node N13.

Sources of the $8^{th}$ and $9^{th}$ transistors M8 and M9 are each connected to the ground, and the common gates are each connected to the second control input V2.

Meanwhile, the eleventh node N11, to which the drain of the $5^{th}$ transistor M5 and the drain of the $7^{th}$ transistor M7 are connected, is connected to the above-described input Va2 of FIG. 2.

Hereinafter, the impedance-attenuated buffer will be described.

The impedance-attenuated buffer includes a $10^{th}$ transistor M10 having a source connected to the power input Vin, a gate connected to the first control voltage terminal Vb1, and a drain connected to a drain of a $11^{th}$ transistor M11 and a drain of a $12^{th}$ transistor M12 at a fourteenth node N14.

The $11^{th}$ transistor M11 has a source connected to the power input Vin, and a common gate connected to a $16^{th}$ transistor M16 at a fifteenth node N15. The fifteenth node N15 is connected to the above-described control input Va1 at the node ND1 of FIG. 2.

The impedance-attenuated buffer includes the $12^{th}$ and $13^{th}$ transistors M12 and M13 having common gates connected to each other at a sixteenth node N16. In this case, the gate and a drain of the $12^{th}$ transistor M12 are connected to each other. The $12^{th}$ transistor M12 may have the same function as a diode. Sources of the $12^{th}$ and $13^{th}$ transistors M12 and M13 are each connected to the ground.

A drain of the $14^{th}$ transistor M14 is connected to a drain of the $13^{th}$ transistor M13 at a seventeenth node N17, a source thereof is connected to a drain of a $15^{th}$ transistor M15 at a fifteenth node N15, and the $14^{th}$ transistor M14 is gated in response to a voltage level at the eleventh node N11. The fifteenth node N15 is connected to the above-described control input Va1 at the node ND1 of FIG. 2.

In this case, the gate and a drain of the $16^{th}$ transistor M16 are connected to each other. The $16^{th}$ transistor M16 may have the same function as a diode.

In addition, a source of the $15^{th}$ transistor M15 is connected to the power input Vin and the gate thereof is connected to the second control voltage terminal Vb2.

The impedance-attenuated buffer includes an NPN bipolar junction transistor M17. The NPN bipolar junction transistor M17 has a collector connected to the fifteenth node N15, an emitter connected to the ground, and a base connected to the drains of the $13^{th}$ and $14^{th}$ transistors at the seventeenth node N17.

A first capacitor C1 is connected between the thirteenth node N13 and an eighteenth node N18. As described above, the drain of the $2^{nd}$ transistor M2, the source of the $7^{th}$ transistor M7, and the drain of the $9^{th}$ transistor M9 are connected to the thirteenth node N13. The eighteenth node N18 is connected to the output node ND2 of FIG. 2.

In FIG. 4, an output of the error amplifier is applied to the gate of the $14^{th}$ transistor M14, and the $15^{th}$ node N15, to which the source of the $14^{th}$ transistor M14 is connected, is connected to the above-described control input Va1 at the node ND1 of FIG. 2.

In FIG. 4, the buffer further lowers impedance of the fifteenth node N15 so that a pole position of the control input Va1 at the node ND1 may be shifted to a higher frequency.

Meanwhile, in FIG. 4, a second capacitor C2 is connected between the eighteenth node N18 and the ground to serve as the above-described capacitor in FIG. 1.

On the basis of the connection relationships shown in FIGS. 3 and 4, the above-described mathematical arithmetic process in FIG. 2 will be described below.

In the circuit diagram of FIG. 4, a voltage V_fb appearing at the second node N2 is referred to as ΔV, and when the feedback resistors R1 and R2 are viewed from the second node N2, it can be seen that the first resistor R1 and the second resistor R2 are connected in parallel (see Equations 1 and 2).

In addition, in order to define the same input voltage to both inverters of the negative resistor, the seventh resistor R7 having the same value as $R_{fb}$ in Equation 10 is placed (see Equation 11 below).

Therefore, the current loss $I_{loss}$ as shown in the following Equation 12 is calculated.

In addition, when the negative resistor is viewed from the second node N2, transconductance may be expressed by the following Equation.

Therefore, the compensation current $I_{comp}$ for which the negative resistor is compensated may be expressed by the following Equation 14.

$$V_{fb} = \Delta V \quad \text{[Equation 9]}$$

$$R1//R2 = \frac{R1 \times R2}{R1 + R2} = R_{fb} \quad \text{[Equation 10]}$$

$$R_{fb} = R7 \quad \text{[Equation 11]}$$

$$I_{loss} = \frac{\Delta V}{R_{fb}} \quad \text{[Equation 12]}$$

$$G_m = g_{m19,21} + g_{m20,22} \quad \text{[Equation 13]}$$

$$I_{comp} = \frac{\Delta V}{g_{m19,21} + g_{m20,22}} \quad \text{[Equation 14]}$$

An important factor in the negative resistor is how closely a value of the feedback resistor which determines an actual voltage gain compensation matches a resistance value of the negative resistor. When this is expressed using a coefficient α, it can be expressed as in the following Equation 15.

$$R_{fb} = \frac{1}{\alpha G_m} \quad \text{[Equation 15]}$$

Therefore, as a value of the coefficient α is closer to one, an effect of the negative resistor is maximized.

Meanwhile, the value of the coefficient α varies sensitively with respect to a change in process or temperature, and thus the effect of the negative resistance decreases. Thus, the LDO voltage regulator according to the embodiment of the present invention uses a degeneration structure including a negative resistor therein to reduce a phenomenon in which the effect is reduced as the value of the coefficient α changes.

More specifically, the transconductance of the degeneration structure is expressed as the following Equation 16.

$$G_{m,d} = \frac{g_{m19,21} \times R_{3,4}}{1 + g_{m19,21} \times R_{3,4}} + \frac{g_{m20,22} \times R_{5,6}}{1 + g_{m20,22} \times R_{5,6}} \quad \text{[Equation 16]}$$

When comparing a magnitude of a variance when $g_m$ changes by 10% in Equations 13 and 16, it can be expressed as follows.

$$\Delta G_m = 1.1(g_{m19,21} + g_{m,20,22}) - (g_{m19,21} + g_{m20,22}) \quad \text{[Equation 17]}$$

$$\Delta G_{m,d} = \frac{1.1g_{m19,21} \times R_{3,4}}{1 + 1.1g_{m19,21} \times R_{3,4}} + \frac{1.1g_{m20,22} \times R_{5,6}}{1 + 1.1g_{m20,22} \times R_{5,6}} - \left(\frac{g_{m19,21} \times R_{3,4}}{1 + g_{m19,21} \times R_{3,4}} + \frac{g_{m20,22} \times R_{5,6}}{1 + g_{m20,22} \times R_{5,6}}\right) \quad \text{[Equation 18]}$$

$$\Delta G_m \gg \Delta G_{m,d} \quad \text{[Equation 19]}$$

Therefore, the degeneration structure may reduce the phenomenon in which the effect of the negative resistor is reduced when the value of the coefficient α changes.

Meanwhile, the comma (,) used in the above equations is to simply express two equations into one equation. As an example, Equation 13 is expressed as one equation with respect to an equation of $g_{m19}+g_{m20}$ and an equation of $g_{m21}+g_{m22}$. Equation 14 is also expressed as one equation with respect to an equation of $\Delta V/(g_{m19}+g_{m20})$ and an equation of $\Delta V/(g_{m21}+g_{m22})$. The same description can be applied to the remaining equations, and thus a more detailed description thereof will be omitted.

Figure 5:
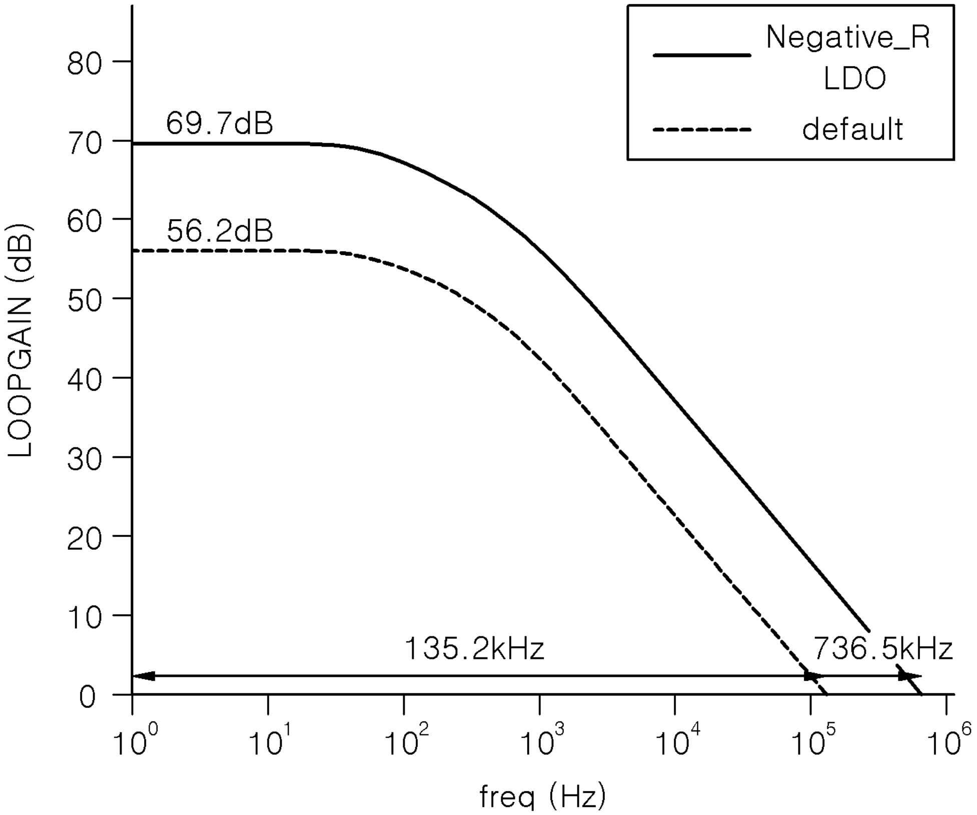
FIG. 5 is a graph illustrating a comparison of the existing bandwidth and a bandwidth of the LDO voltage regulator according to the embodiment of the present invention.

FIG. 5 is a graph illustrating a comparison of the existing bandwidth and a bandwidth of the LDO voltage regulator according to the embodiment of the present invention.

As shown in FIG. 5, when compared to an LDO voltage regulator (default) to which the negative resistance circuit according to the embodiment of the present invention is not applied, it can be confirmed that the LDO voltage regulator (Negative_R LDO), to which the negative resistance circuit according to the embodiment of the present invention is applied, has a voltage gain increased, by about 13.5 dB, from 56.2 dB to 69.7 dB, and a bandwidth increased, by about 5.4 times, from 135.2 kHz to 736.5 kHz.

Figure 6:
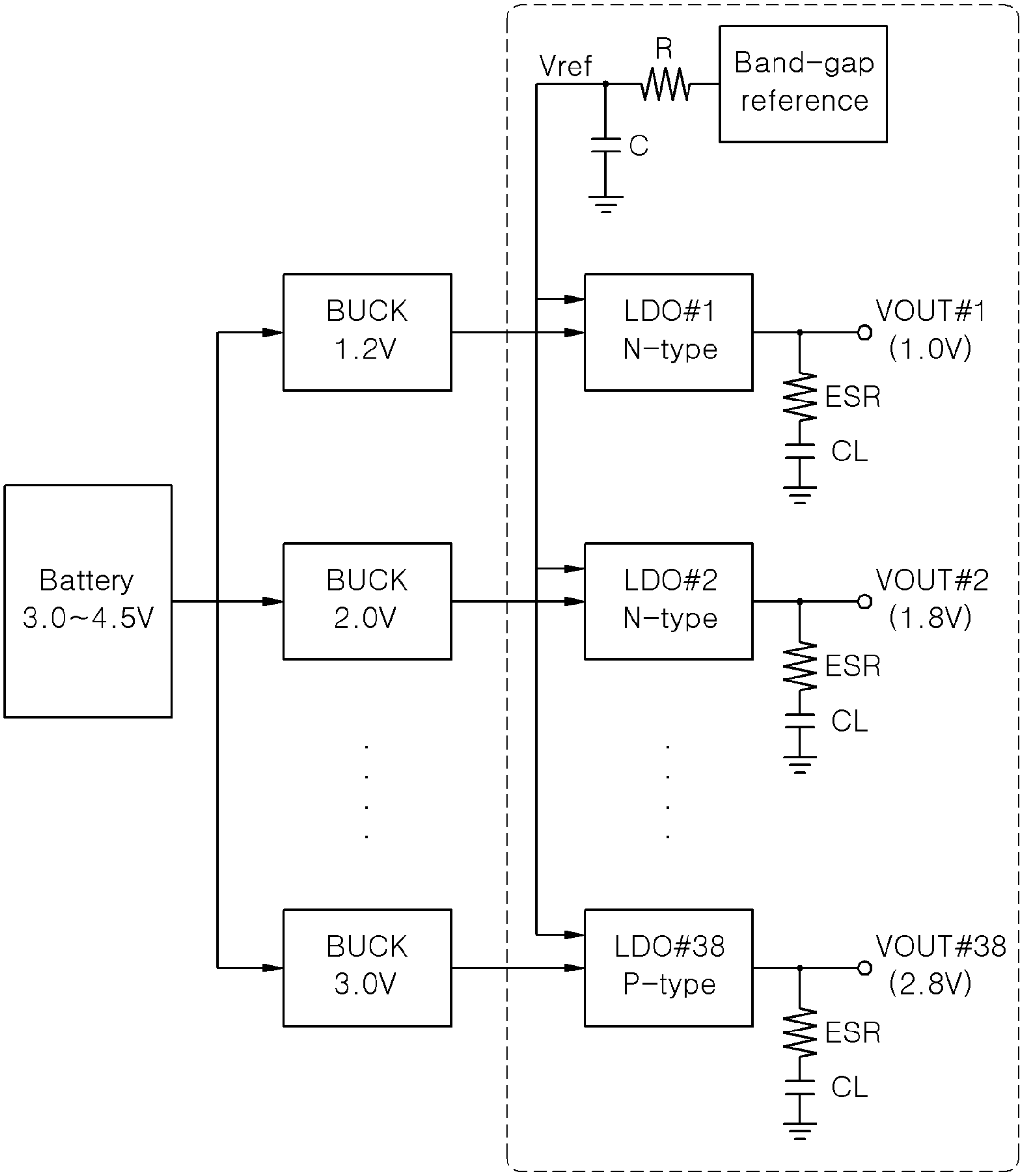
FIG. 6 is a block diagram illustrating a power management integrated circuit (PMIC) of a smartphone application processor (AP) to which the LDO voltage regulator according to the embodiment of the present invention is applied.

FIG. 6 is a block diagram illustrating a power management integrated circuit (PMIC) of a smartphone application processor (AP) to which the LDO voltage regulator according to the embodiment of the present invention is applied.

As shown in FIG. 6, it can be seen that a DC-DC buck converter, an LDO voltage regulator, and a band-gap reference circuit are used in the PMIC of the smartphone AP. A voltage generated by a battery is dropped by the DC-DC buck converter, and a ripple generated by the DC-DC buck converter is removed through the LDO voltage regulator to generate an output Vout. The band-gap reference circuit generates a constant voltage with respect to a temperature change and applies the constant voltage as a reference voltage of the LDO voltage regulator. In order to generate a voltage with high reliability, since the PMIC should have a high voltage gain and a wide bandwidth, it can be seen that the use of the LDO voltage regulator to which the negative resistor circuit according to the embodiment of the present invention is applied is very suitable.

As described above, in the LDO voltage regulator according to the embodiment of the present invention, the circuit including the negative resistor generates a current so that current loss caused due to a non-ideal virtual ground is compensated for. In this way, the voltage gain of the overall LDO increases and the bandwidth thereof is expanded. Consequently, the LDO voltage regulator can be applied in various fields including PMICs operating in a high frequency band and micro-portable electronic devices.

According to the embodiment of the present invention, the voltage gain can be increased without increasing the size of the transistor inside the amplifier, and thus the bandwidth can be greatly expanded so that the existing limitation of an inverse relationship between the voltage gain and the bandwidth can be overcome. Accordingly, the load regulation can be significantly lowered to increase reliability of the circuit.

That is, through the LDO voltage regulator to which the current generating circuit having a negative resistance component proposed in the present invention is applied, loss occurring in the amplifier inside the LDO voltage regulator can be compensated for. The loss is compensated for to increase a voltage gain and a bandwidth of the LDO voltage regulator simultaneously so that the reliability and performance of the LDO voltage regulator are improved. In this way, it is possible to improve the performance and reliability of PMICs operating in a high-frequency band and micro-portable electronic devices to which the LDO voltage regulator is used.

The term "part" used in the present specification may refer to a unit including one or a combination of two or more of, for example, hardware, software, and firmware. "Part" can be interchangeably used with terms such as, for example, "module," "unit," "logic," "logical block," "component," or "circuit." "Part" may be a minimum unit of an integrally constituted part or a portion thereof. "Part" may be a minimum unit or a portion thereof that performs one or more functions. "Part" may be implemented mechanically or electronically. For example, "part" may include at least one among an application-specific integrated circuit (ASIC) chip, which performs certain operations that are known or to be developed, field-programmable gate arrays (FPGAs), and a programmable-logic device.

At least some of devices (e.g., modules or functions thereof) or methods (e.g., operations) according to various embodiments of the present invention can be implemented as commands stored in the form of program modules in, for example, computer-readable storage media. When the commands are executed by, for example, a processor, one or more processors may perform functions corresponding to the commands. A computer-readable storage medium may be, for example, a memory.

Computer-readable recording media may include hard disks, floppy disks, magnetic media (e.g., a magnetic tape), optical media (e.g., a compact disc read only memory (CD-ROM) or a digital versatile disc (DVD)), magneto-optical media (e.g., a floptical disk), hardware devices (e.g., a ROM, a random access memory (RAM), or a flash memory), and the like. In addition, examples of the program commands may include machine language code generated by a compiler, as well as high-level language codes which are executable by a computer using an interpreter or the like. The above-described hardware devices may be configured to operate as one or more software modules to perform operations of various embodiments, and vice versa.

A module or a program module according to various embodiments may include one or more among the above-described components, some thereamong may be omitted, or additional components may be further included. Operations performed by modules, program modules, or other components according to various embodiments may be executed in a sequential, parallel, repetitive, or heuristic manner. Also, some operations may be performed in a different order or omitted, or other operations may be added.

In accordance with the present invention, a low dropout (LDO) voltage regulator that greatly improves load regulation with a wide bandwidth by increasing a gain without increasing a size and current consumption of a transistor inside an amplifier can be provided.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A low dropout (LDO) voltage regulator comprising:

an amplifier configured to receive a reference voltage through a negative input terminal, receive a feedback voltage through a positive input terminal, and amplify a difference between the feedback voltage and the reference voltage;

a buffer which has an input connected to an output of the amplifier and an output and performs a buffering operation;

a pass transistor configured to generate a driving current according to an output signal of the buffer;

a voltage divider configured to form an output signal according to the driving current and generate the feedback voltage through a feedback resistor connected thereto; and a negative resistor circuit connected between the reference voltage and the feedback resistor and configured to generate a compensation current compensating for a loss current generated in the feedback resistor, wherein the negative resistance circuit includes:

a first inverter configured to generate a first inverting output in response to the reference voltage; and a second inverter configured to generate a second inverting output in response to the feedback voltage, wherein the second inverting output is connected to a gate of the first inverter, and the first inverting output is connected to a gate of the second inverter, and wherein:

the first inverter includes a first p-type metal oxide semiconductor (PMOS) transistor and a first n-type metal oxide semiconductor (NMOS) transistor which have common gates connected to each other at a first node;

the second inverter includes a second PMOS transistor and a second NMOS transistor which have common gates connected to each other at a second node;

a drain of the first PMOS transistor and a drain of the first NMOS transistor are connected to the second node; and a drain of the second PMOS transistor and a drain of the second NMOS transistor are connected to the first node.

2. The LDO voltage regulator of claim 1, wherein the negative resistor circuit includes a cross-coupled inverter.

3. The LDO voltage regulator of claim 1, wherein the compensation current has a value that is proportional to a difference between the feedback voltage and the reference voltage and that is inversely proportional to the feedback resistance.

4. The LDO voltage regulator of claim 1, wherein the voltage divider includes:

a first resistor having one end connected to the pass transistor; and a second resistor connected between a ground and the other end of the first resistor where the feedback voltage is generated.

5. The LDO voltage regulator of claim 1, wherein the negative resistance circuit further includes third and fourth resistors connected in series, wherein one end of the third resistor is connected to a source of the first PMOS transistor, and one end of the fourth resistor is connected to a source of the second PMOS transistor.

6. The LDO voltage regulator of claim 5, wherein the negative resistance circuit further includes:

a third PMOS transistor having a source connected to a power input, a drain connected between the third and fourth resistors, and a gate connected to a control voltage; and a third NMOS transistor having a source connected to the ground, a drain connected between the fifth and sixth resistors, and a gate connected to the control input.

7. The LDO voltage regulator of claim 1, wherein:

the negative resistance circuit further includes fifth and sixth resistors connected in series; and one end of the fifth resistor is connected to the source of the first NMOS transistor, and one end of the sixth resistor is connected to the source of the second NMOS transistor.

8. The LDO voltage regulator of claim 1, wherein:

the negative resistance circuit further includes a seventh resistor having one end connected to the reference voltage and the other end connected to the first node; and the seventh resistor has a resistance value that is equivalent to the feedback resistor.

* * * * *